United States Patent Office 2,871,220
Patented Jan. 27, 1959

2,871,220

STABILIZATION OF POLYOXYMETHYLENES WITH PHENOLS

Robert Neal MacDonald, Wilmington, Del., assignor to E. I. du Pont de Nemours and Company, Wilmington, Del., a corporation of Delaware No Drawing. Application November 21, 1956
Serial No. 623,553

7 Claims. (Cl. 260—45.95)

This invention relates to high molecular weight polyoxymethylenes, and, more specifically, it relates to such polyoxymethylenes having improved thermal stabilities.

This is a continuation-in-part of copending patent application of Serial No. 327,693, now abandoned filed by R. N. MacDonald on December 23, 1952.

U. S. Patent 2,768,994, issued to R. N. MacDonald on October 30, 1956, describes normally solid, synthetic, high molecular weight polyoxymethylenes which have a degree of toughness of at least 1, or which have a reaction rate constant for thermal degradation at 222° C. of less than 1% by weight per minute. The degree of toughness is measured by the consecutive steps of compression-molding the polyoxymethylene into a film 3-7 mils in thickness, heating the film in air at 105° C. for seven days, cooling the film to room temperature, and, while at room temperature, manually folding and creasing the film along a line followed by manually folding and creasing the film in the reverse direction along the same line without a break occurring in the film along that line. The numerical value of the degree of toughness is 1 if no break occurs after the single cycle of folding and creasing, the value is 2 if the folding and creasing can be continued through 2 such cycles, and higher values of the degree of toughness are obtained by continuing through a higher number of cycles. In copending applications, U. S. Serial Numbers 365,234, Patent No. 2,841,570; 365,235, Patent No. 2,828,286; and 365,278, Patent No. 2,844,561, filed June 30, 1953, there are disclosed methods of preparing novel polyoxymethylenes which can be formed into tough, flexible films that retain their toughness and flexibility over long periods of time. The prior art teaches that polyoxymethylenes of moderately high molecular weight can be made which initially possess desirable properties. These known polymers can be formed into films or other articles that are tough and flexible but the polymer degrades quickly when heated at an elevated temperature, e. g., 105° C., as evidenced by the generation of formaldehyde fumes and embrittlement of films prepared therefrom.

It is an object of the present invention to provide as a new composition of matter a polyoxymethylene having a degree of toughness of at least 1 or a reaction rate constant for thermal degradation at 222° C. of less than 1% by weight per minute, and having an improved thermal stability by reason of the presence of certain phenolic stabilizers. It is another object of this invention to provide thermal stabilizers which can be incorporated into a polyoxymethylene, and thereby produce polyoxymethylene composition which is more stable to thermal treatment than the original polyoxymethylene. It is another object of this invention to provide methods of incorporating stabilizing phenols into preformed polyoxymethylenes to produce polymers having improved toughness, flexibility, and thermal stability.

The above objects are accomplished by intimately associating any of certain phenolic compounds with a normally solid, synthetic, high molecular weight polyoxymethylene having a degree of toughness of at least 1 or having a reaction rate constant for thermal degradation at 222° C. of less than 1% by weight per minute. Preferably, the polyoxymethylene is one which has a degree of toughness of at least 1, and also exhibits a reaction rate constant for thermal degradation at 222° C. of less than 1% by weight per minute. The thermal stabilizing compound employed in combination with the above polyoxymethylenes may be phenol or a substituted phenol having a pK of less than 6.0 for every stage of dissociation of said phenol.

One of the starting materials for this invention is a normally solid, synthetic, high molecular weight polyoxymethylene described and claimed in U. S. Patent 2,768,994 issued October 30, 1956, to R. N. MacDonald. That polyoxymethylene is described as (1) one which has a degree of toughness of at least 1 determined by the consecutive steps of compression-molding the polyoxymethylene into a film 3 to 7 mils in thickness, heating the film in air at 105° C. for 7 days, cooling the film to room temperature, and, while at room temperature, manually folding and creasing the film along a line, and manually folding and creasing the film in the reverse direction along the same line without a break occurring along that line, or (2) one which does not have a degree of toughness of at least 1, but which does have a reaction rate constant for thermal degradation at 222° C. of less than 1% by weight per minute measured by thermally degrading the polyoxymethylene in a vessel open to the atmosphere. These polyoxymethylenes have a thermal stability which is better than any polyoxymethylene known in the prior art.

The thermal stabilizing compound employed in this invention has been found to produce an even greater degree of thermal stability in the polyoxymethylenes described above. The thermal stabilizer of this invention is phenol or a substituted phenol having a pK of greater than 6.0 for every stage of dissociation of the phenolic compound. The term "pK" is defined as the negative logarithm of the dissociation constant measured at 25° C. There are, of course, compounds, such as salicyclic acid, which dissociate in more than one step, the first step exhibiting a higher dissociation constant than any subsequent step. In the terms of this invention a phenol is not operable if any stage of dissociation results in a pK of less than 6.0. The pK and/or the dissociation constant may be found in the International Critical Tables or other scientific publications for many of the phenolic compounds, and, for those compounds not found in such publications, the methods of measuring the pK and/or the dissociation constant at 25° C. are well known to skilled chemists. Substituted phenols having a pK of less than 6.0 are not operable as thermal stabilizers in this invention; moreover, some of those phenols actually are so acidic as to degrade the polyoxymethylene. Picric acid, p-toluene sulfonic acid, p-hydroxy benzoic acid, and salicylic acid are examples of the inoperable substituted phenols which have a pK of less than 6.0. The phenols which may be used as stabilizers in this invention include phenol and any substituted phenol which has a pK greater than 6.0. A partial list of such compounds and their pK values includes phenol (9.97), hydroquinone (9.96), resorcinol (6.2), pyrogallol (7.7), p-nitrosophenol (6.15), alpha-naphthol (8.0), beta-naphthol (8.0), o-nitrophenol (7.3), m-nitrophenol (8.3), p-nitrophenol (7.2), o-cresol (7.38), m-cresol (7.73), p-cresol (8.22), di-ortho-xylenol (10.6), di-meta-xylenol (10.1), phenyl-salicylate (7.11), N-phenyl-p-hydroxymorpholine (7.11), nitrosothymol (6.83), 4-di-(beta-hydroxyethyl)amino-phenol (7.43), p-phenylphenol (7.0), p-hydroxydiphenyl (7.0). Other phenols which are known to be operable, but for which an accurate pK value is not known, include di-beta-napthol, methylene-bis(2-hydroxy-3-tertiary-butyl-5-methylbenzene), alkyl-substituted aminophenol, propyl gallate, and p,p'-di-hydroxydiphenyl-methane, 2,2'-methylene-bis-(6-tertiary-butyl-4-methyl phenol), 2,6-di-tertiary-butyl-para-cresol, 2,4,6-trimethyl phenol, and methylene bis(beta-naphthol).

A convenient way for preparing the new compositions of this invention is to dissolve the phenolic stabilizer in a volatile solvent, add an amount of solution to the polyoxymethylene sufficient to provide from 0.001% to 10%, and, preferably, 0.1% to 5%, by weight of the phenolic stabilizer based on the polymer, and then stir the mixture. The solvent is thereafter removed by evaporation. Alternatively, the phenolic stabilizer can be incorporated into molten polyoxymethylene by milling or by other known procedures.

It is believed that the chain of a polyoxymethylene, which is composed of recurring —$CH_2O$— units, is subject to degradative attack by three separate mechanisms. Firstly, the hydrogen atoms are subject to an oxidative attack by oxygen or by free radicals having an oxidative tendency. Secondly, the oxygen of the polymer chain is subject to hydrolytic attack by hydrogen ion or its equivalent. Experimental evidence indicates that both the oxidative attack and the hydrolytic attack cause chain cleavage of the polymer. The third attack is one which is believed to start at the end of a polymer chain to cause an unzippering effect, in that the end formaldehyde unit is broken away and then the next unit, and so on, until a strong unit is reached that will not break away. These three mechanisms may be inhibited by the presence of scavenger compounds for destroying free oxidative radicals and compounds causing hydrolytic attack, and by the formation of strong end groups on the polymer chain. It is believed that the stabilizing phenolic compounds of this invention find their primary use in scavenging the oxidative radicals from the polymer environment, although they may also help to stabilize the polymer in other ways.

The examples which follow are submitted to illustrate and not to limit this invention. Parts and percentages are by weight unless otherwise specified. Degree of toughness and reaction rate constant for thermal degradation at 222° C. are measured as described in U. S. Patent 2,768,994. Inherent viscosity is measured at 60° C. on a 0.5% solution of the polymer in p-chlorophenol containing 2% by weight of alpha-pinene.

EXAMPLE 1

Samples of polyoxymethylene prepared by scavenging a cold ether solution of monomeric formaldehyde, then initiating polymerization at —75° C. with butyl amine, as described below, were treated with ether solutions of di-beta-naphthol and methylene-bis(2-hydroxy-3-tertiary-butyl-5-methyl-benzene) to incorporate 2% of stabilizer, based on the weight of the polyoxymethylene. After evaporation of the solvent and air drying for several days, the samples and an untreated control were compression-moided at 190° C. into films about 5 mils in thickness. These films were then tested for the degree of toughness as described above, and all films were found to have a degree of toughness of at least 100 at end of the first period of being heated in air at 105° C. However, when this heating was continued for a second period of 7 days, the unstabilized control failed as shown in Table I.

Table I

| Stabilizer | Percent Weight Loss and Toughness [1] | | Percent Weight Loss during Second Week |
|---|---|---|---|
| | 1 Week | 2 Weeks | |
| None (Control) | 5.6 Tough | 22.8 Brittle | 17.2 |
| Di-beta-naphthol | 6.5 Tough | 9.3 Tough | 2.8 |
| Methylene-bis(2-hydroxy-3-tertiary-butyl-5-methyl-benzene) | 7.1 Tough | 9.4 Tough | 2.3 |

[1] "Tough"—No evidence of failure after 100 creasing cycles. "Brittle"—Broke in first creasing.

The polyoxymethylene used above was prepared as follows:

Three hundred fifty grams of anhydrous ether was placed in a 2-liter flask equipped with a mechanical stirrer and gas inlets and outlets. The flask was cooled in a Dry-Ice/acetone bath and the solvent stirred rapidly, as formaldehyde gas was passed into the solvent. The monomeric formaldehyde was obtained from the pyrolysis of alpha-polyoxymethylene under 100 mm. pressure and was purified by passing under this pressure through 12 U-shaped traps held at —40° C. The ether solution of formaldehyde obtained was separated from the film of polymer on the walls of the flask and traces of floating solid by gravity filtration. The clear filtrate was stirred rapidly under nitrogen at atmospheric pressure and held at —70° C. to —75° C. as 0.06 gram of n-butylamine (0.024 mole percent) in 28 grams of ether was added gradually over a 43-minute period from a burette. The white, granular polyoxymethylene obtained was found to have an inherent viscosity of 2.3 at 0.5% concentration in p-chlorophenol containing 2% alpha-pinene at 60° C.

EXAMPLE 2

Two grams of polyoxymethylene, prepared in a manner similar to the polymer in Example 1, 0.05 gram of di-beta-naphthol, and 7.1 grams of diethyl ether were stirred together with a spatula. After the blend had stood overnight, the ether was removed by vacuum evaporation, the blend was then heated at 135° C. for one hour and weighed. The sample thus pretreated was heated under nitrogen at 180° C. for 30 minutes and weighed, and the loss in weight following the 180° C. treatment determined.

The above experiment was duplicated in every detail, using methylene-bis(2-hydroxy-3-tertiary-butyl-5-methylbenzene) in place of di-beta-naphthol.

Table II summarizes the loss in weight of the phenol-containing samples in comparison with an untreated control.

Table II

| Stabilizer | Percent Weight Loss/180° C./30 minutes |
|---|---|
| None (Control) | 8.9 |
| Di-beta-naphthol | 4.5 |
| Methylene-bis (2-hydroxy-3-tertiary-butyl-5-methyl-benzene) | 4.4 |

EXAMPLE 3

Three grams of a polyoxymethylene, prepared in a manner similar to the polymer of Example 1, was mixed with 0.06 gram of beta-naphthol in 10 cc. of diethyl ether and, after the mixture had been stirred with a spatula, the ether was removed under vacuum. After the sample had been dried overnight in a desiccator, the weight loss at 180° C. under nitrogen was determined as described in Example 2. A control sample containing no beta-naphthol lost 16% in weight while the loss in the sample containing the beta-naphthol was 13.5%.

EXAMPLE 4

Table III is a summary of the weight loss suffered by compositions consisting of blends of polyoxymethylenes and the indicated compounds, prepared by incorporating into 50 parts of finely divided polyoxymethylene 1 part of the compound. The weight loss was determined by pressing an exactly weighed 0.5000 gram sample of the blend between aluminum foils for 5 minutes at 200° C. and 3000 pounds per square inch ram pressure. The films thus obtained were removed from the press, immediately cooled, and then carefully weighed. The weight loss was compared with that of a similarly prepared film containing no added stabilizing compound.

Table III

| Stabilizer | Percent Weight Loss of Stabilized Sample | Percent Weight Loss of Unstabilized Sample |
| --- | --- | --- |
| p-Hydroxydiphenyl | 8.6 | [1] 9.8 |
| 6-nitrosothymol | 8.8 | [1] 9.8 |
| Phenyl salicylate | 5.1 | [1] 9.8 |
| n-Butyl-p-aminophenol | 10.1 | [2] 19.7 |
| Isobutyl-p-aminophenol | 9.7 | [2] 19.7 |
| p-Hydroxyphenyl-morpholine | 9.9 | [2] 19.7 |

[1] Polymer having an inherent viscosity of 2.39 and a degree of toughness greater than 100, and made essentially as described in Example 1 in the copending application of M. F. Bechtold and R. N. MacDonald, U. S. Serial Number 365,278, filed June 30, 1953.
[2] Polymer having an inherent viscosity of 1.75 and made essentially as described in Example V in U. S. Patent 2,768,994, issued October 30, 1956, to R. N. MacDonald.

EXAMPLE 5

A polyoxymethylene composition containing 0.2% by weight of 4,4'-butylidene bis(3-methyl-6-tertiary-butyl phenol) exhibited a reaction rate constant for thermal degradation at 222° C. of 0.16% by weight per minute. Samples to be tested for thermal stability were prepared by mixing one of the phenolic compounds shown in Table IV with a portion of the original polyoxymethylene composition. The compositions were prepared by adding, to an acetone-wet filter cake of polyoxymethylene, acetone, 0.2% by weight of 4,4'-butylidene bis(3-methyl-6-tertiary-butyl phenol), and the indicated amount of the phenolic compound to be tested. The mixture was stirred, dried overnight in a vacuum at 50° C., and was then worked on 4-inch milling rolls at 200° C. for 5 minutes prior to testing for the reaction rate constant for thermal degradation at 222° C. The results of the several tests are shown in Table IV.

Table IV

| Phenolic Compound Tested | Weight Percent of Phenolic Compound in Polymer | pK of Phenolic Compound | Reaction Rate Constant For Thermal Degradation at 222° C., percent |
| --- | --- | --- | --- |
| None (Control) | None | | 0.16 |
| Picric Acid | 0.77 | 0.38 | 0.79 |
| p-Hydroxy Benzoic Acid | 0.76 | 4.5 | 0.31 |
| Salicylic Acid | 0.76 | 3.0 | 0.43 |
| p-Toluene Sulfonic Acid | 0.77 | 100% [1] dissociated. | ([1]) |

[1] p-Toluene sulfonic acid is 100% dissociated, and therefore has an indefinitely low pK$_a$. The reaction rate constant could not be measured since the mere drying of the polymer containing the p-toluene sulfonic acid caused about 25% of the polymer to volatilize.

The phenol may be incorporated into the polymer in any manner well known to those skilled in the art. A convenient way is to dissolve the phenol in a volatile organic solvent, preferably one which is also at least a partial solvent for the polyoxymethylene, and to steep the polymer in this solution. Thereafter the solvent may be removed by evaporation, desirably under reduced pressure. As an alternative, the phenols, as such, may be added to the polymer and the blend homogenized by milling, plasticating, or other mixing at a temperature above the melting point of the polymer. In still another alternative, the blend may be made by dissolving the phenol in a solvent for the polymer and adding the solution to a solution of the polymer in the same solvent. In yet another alternative, the phenol may be added to the polymerization system either before or after the polymer has formed, but before isolation of the polymer.

The stabilized compositions of this invention are useful for conversion to films, fibers, molded articles, and the like, by melt-extrusion, injection-molding, compression-molding, and other fabrication methods known to the art.

I claim:

1. The thermally stabilized polyoxymethylene composition which comprises a normally solid, synthetic, high molecular weight polyoxymethylene selected from the group consisting of (1) polyoxymethylenes having a degree of toughness of at least 1, said degree of toughness of at least 1 being determined by the consecutive steps of compression-molding said polyoxymethylene into a film 3 to 7 mils in thickness, heating said film in air at 105° C. for 7 days, cooling said film to room temperature, and, while maintaining said film at room temperature, manually folding and creasing said film along a line, and manually folding and creasing said film in the reverse direction along the same line without a break occurring in the film along said line, and (2) polyoxymethylenes failing to exhibit a degree of toughness of at least 1, but having a reaction rate constant for thermal degradation at 222° C. of less than 1% by weight per minute, measured by thermally degrading said polyoxymethylene in a vessel open to the atmosphere; and 0.001%–10% by weight of said polyoxymethylene of a thermal stabilizing compound from the group consisting of phenol and substituted phenols having a pK at 25° C. of greater than 6.0 for every stage of dissociation of said substituted phenol; said thermally stabilized polyoxymethylene composition being characterized in that said composition exhibits a greater degree of thermal stability than does said poloxymethylene in the absence of said thermal stabilizing compound.

2. The thermally stabilized polyoxymethylene composition which comprises a normally solid, synthetic, high molecular weight polyoxymethylene having a degree of toughness of at least 1, said degree of toughness of at least 1 being determined by the consecutive steps of compression-molding said polyoxymethylene into a film 3 to 7 mils in thickness, heating said film in air at 105° C. for 7 days, cooling said film to room temperature, and, while maintaining said film at room temperature, manually folding and creasing said film along a line, and manually folding and creasing said film in the reverse direction along the same line without a break occurring in the film along said line, and 0.001%–10% by weight of said polyoxymethylene of a thermal stabilizing compound from the group consisting of phenol and substituted phenols having a pK at 25° C. of greater than 6.0 for every stage of dissociation of said substituted phenol; said thermally stabilized polyoxymethylene composition being characterized in that said composition exhibits a greater degree of thermal stability than does said polyoxymethylene in the absence of said thermal stabilizing compound.

3. The thermally stabilized polyoxymethylene composition which comprises a normally solid, synthetic, high molecular weight polyoxymethylene having a reaction rate constant for thermal degradation at 222° C. of less than 1% by weight per minute, measured by thermally degrading said polyoxymethylene in a vessel open to the atmosphere, and 0.001%–10% by weight of said polyoxymethylene of a thermal stabilizing compound from the group consisting of phenol and substituted phenols having a pK at 25° C. of greater than 6.0 for every stage of dissociation of said substituted phenol; said thermally stabilized polyoxymethylene composition being characterized in that said composition exhibits a greater degree of thermal stability than does said poloxymethylene in the absence of said thermal stabilizing compound.

4. The composition of claim 3 in which said reaction rate constant is less than 0.5% by weight.

5. The thermally stabilized polyoxymethylene composition which comprises a normally solid, synthetic, high molecular weight polyoxymethylene having a degree of toughness of at least 1 determined by the consecutive steps of compression-molding said polyoxymethylene into a film 3 to 7 mils in thickness, heating said film in air at 105° C. for 7 days, cooling said film to room temperature, and, while maintaining said film at room temperature, manually folding and creasing said film along a line, and manually folding and creasing said film in the reverse direction along the same line without a break occurring in the film along said line, and said polyoxymethylene also exhibiting a reaction rate constant for thermal degradation at 222° C. of less than 1% by weight per minute measured by thermally degrading said polyoxymethylene in a vessel open to the atmosphere, and 0.1%–5% by weight of a thermal stabilizing compound from the group consisting of phenol and substituted phenols having a pK at 25° C. of greater than 6.0 for every stage of dissociation of said substituted phenol; said thermally stabilized polyoxymethylene composition being characterized in that said composition exhibits a greater degree of thermal stability than does said polyoxymethylene in the absence of said thermal stabilizing compound.

6. A film comprising the thermally stabilized composition of claim 1.

7. A fiber comprising the thermally stabilized composition of claim 1.

References Cited in the file of this patent

UNITED STATES PATENTS

| | | |
|---|---|---|
| 2,195,122 | Nordlander | Mar. 26, 1940 |
| 2,296,249 | Austin et al. | Sept. 22, 1942 |
| 2,768,994 | MacDonald | Oct. 30, 1956 |